United States Patent
Stebnicki et al.

(10) Patent No.: US 6,997,309 B2
(45) Date of Patent: Feb. 14, 2006

(54) ROLLER CRADLE AND MODULAR CONVEYING ASSEMBLY FORMED THEREFROM

(75) Inventors: James C. Stebnicki, Glendale, WI (US); Dean A. Wieting, Milwaukee, WI (US); Kevin S. Hansen, Grafton, WI (US)

(73) Assignee: Rexnord Industries, Inc., Milwaukee, WI (US)

( * ) Notice: Subject to any disclaimer, the term of this patent is extended or adjusted under 35 U.S.C. 154(b) by 0 days.

(21) Appl. No.: 10/790,485

(22) Filed: Mar. 1, 2004

(65) Prior Publication Data

US 2005/0109583 A1    May 26, 2005

Related U.S. Application Data

(60) Provisional application No. 60/451,520, filed on Mar. 3, 2003, provisional application No. 60/529,539, filed on Dec. 15, 2003.

(51) Int. Cl.
B65G 17/06    (2006.01)
(52) U.S. Cl. .................................. 198/850; 198/853
(58) Field of Classification Search ................ 198/850, 198/853
See application file for complete search history.

(56) References Cited

U.S. PATENT DOCUMENTS

| | | |
|---|---|---|
| 1,377,450 A | 5/1921 | Whipple |
| 1,641,642 A | 9/1927 | Pangborn |
| 2,554,038 A | 5/1951 | Lemmon |
| 3,082,861 A | 3/1963 | Kornylak |
| 3,550,756 A | 12/1970 | Kornylak |
| 3,964,588 A | 6/1976 | Kornylak |
| 4,231,469 A | 11/1980 | Arscott |
| D289,734 S | 5/1987 | Schroeder et al. |
| D299,424 S | 1/1989 | Schroeder et al. |
| D299,425 S | 1/1989 | Schroeder et al. |
| 4,821,869 A | 4/1989 | Hodlewsky |
| 4,880,107 A | 11/1989 | Deal |
| 4,909,380 A | 3/1990 | Hodlewsky |
| 4,925,016 A | 5/1990 | LaPeyre |
| 4,993,540 A | 2/1991 | van Capelleveen |
| 5,096,050 A | 3/1992 | Hodlewsky |
| 5,224,583 A | 7/1993 | Palmaer et al. |
| 5,238,099 A | 8/1993 | Schroeder et al. |
| 5,261,525 A | 11/1993 | Garbagnati |
| 5,330,045 A | 7/1994 | Hodlewsky |
| 5,404,997 A | 4/1995 | Schreier et al. |
| 5,706,934 A | 1/1998 | Palmaer et al. |
| 6,044,956 A | 4/2000 | Henson et al. |
| 6,148,990 A | 11/2000 | Lapeyre et al. |
| 6,209,714 B1 | 4/2001 | Lapeyre et al. |
| 6,367,616 B1 | 4/2002 | Lapeyre et al. |
| 6,398,015 B1 | 6/2002 | Sedlacek et al. |
| 6,494,312 B2 | 12/2002 | Costanzo |

(Continued)

*Primary Examiner*—Joe Dillon, Jr.
(74) *Attorney, Agent, or Firm*—Quarles & Brady LLP

(57) ABSTRACT

A modular conveyor belt having rollers for minimizing damage to the belt when transferring high friction products. The rollers are supported by easily assembled cradles that are supported between adjacent belt modules. In one embodiment, the cradles include a first part and a second part. The first part has a first hinge member and a first shaft extending from the first hinge member. The first shaft has a hollow portion opening at a first shaft distal end. The second part has a second hinge member and a second shaft extending from the second hinge member. The second shaft has a second shaft distal end received in the hollow portion of the first shaft through the first shaft distal end. In another embodiment, the roller supported by one of the cradles extends into a concave portion of an adjacent module.

33 Claims, 4 Drawing Sheets

U.S. PATENT DOCUMENTS 6,604,625 B2 * 8/2003 Greve ..................... 198/853
6,827,204 B2 * 12/2004 Cribiu' .................. 198/844.1
2001/0045346 A1 11/2001 Costanzo
2002/0020609 A1 2/2002 Lapeyre et al.

* cited by examiner

ROLLER CRADLE AND MODULAR CONVEYING ASSEMBLY FORMED THEREFROM

CROSS REFERENCES TO RELATED APPLICATIONS

This application claims priority to U.S. Provisional Patent Application No. 60/451,520 filed on Mar. 3, 2003 and U.S. Provisional Patent Application No. 60/529,539 filed Dec. 15, 2003.

STATEMENT REGARDING FEDERALLY SPONSORED RESEARCH

Not Applicable.

BACKGROUND OF THE INVENTION

The present invention relates to modular conveyor belts and chains, and more particularly to a roller cradle and a modular conveying assembly including at least one roller cradle.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel.

Modular belts can transport products in the direction of conveyor travel, but have difficulty transferring a product, especially a high friction product, onto or off of the belt. In addition, high friction products can easily damage the belt if the product is transferred onto, or off of, the chain from a direction other than the chain direction of travel. A known conveyor belt disclosed in U.S. Pat. No. 4,231,469 issued to Arscott solves this problem by supporting the high friction products on rollers. The rollers are supported by roller cradles, and extend above the cradle for rolling contact with an object being conveyed. The rollers reduce friction between the belt and the object. Unfortunately, assembling the roller in the cradle is difficult requiring insertion of the roller into the cradle, and then slipping an axle or two stub axles through holes formed through the cradle walls and into the roller. The axle must then be secured to prevent it from slipping out of one of the holes formed in the cradle wall.

SUMMARY OF THE INVENTION

The present invention provides a modular conveyor belt having rollers for minimizing damage to the belt when transferring high friction products. The rollers are supported by easily assembled cradles that are supported between adjacent belt modules. In one embodiment, the cradles include a first part and a second part. The first part has a first hinge member and a first shaft extending from the first hinge member. The first shaft has a hollow portion opening at a first shaft distal end. The second part has a second hinge member and a second shaft extending from the second hinge member. The second shaft has a second shaft distal end received in the hollow portion of the first shaft through the first shaft distal end to form the cradle. In another embodiment, the roller supported by one of the cradles extends into a concave portion of an adjacent module to minimize gaps between the roller and adjacent module.

A general objective of the present invention is to provide a modular conveying assembly that can transfer high friction objects without severely damaging the objects or the assembly. This objective is accomplished by providing a roller cradle in the assembly that supports a roller that reduces friction between the object and the conveying assembly.

Another objective of the present invention is to provide a roller cradle that is easily assembled. This objective is accomplished by providing a roller cradle assembled from two interfitting parts to form a roller supporting shaft extending between hinge members.

This and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF PREFERRED EMBODIMENTS

Figure 1:
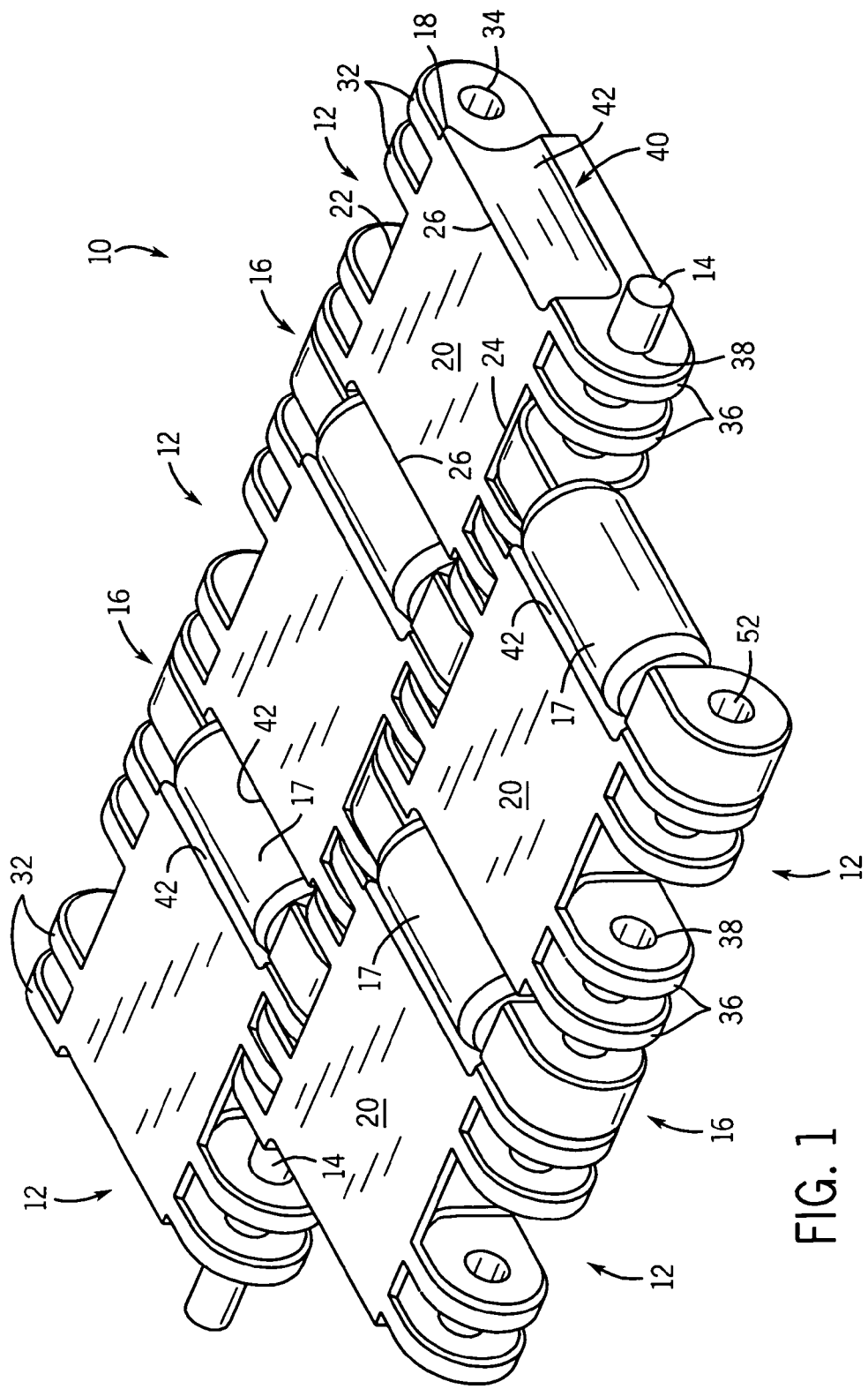
FIG. 1 is a perspective view of a modular conveyor belt incorporating the present invention.
Figure 2:
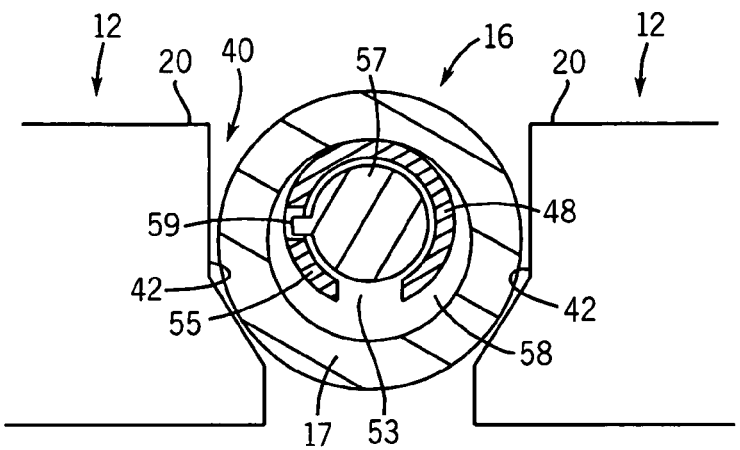
FIG. 2 is a cross sectional view of a section of the belt in FIG. 1.

A modular conveying assembly, or belt 10, shown in FIGS. 1 and 2, includes a plurality of chain modules 12 assembled in an edge to edge relation to form the continuous belt 10. Hinge pins 14 join adjacent modules 12, and pivotally connect the adjacent modules 12 in the direction of belt travel. Cradles 16 retained by the hinge pins 14 between modules 12 support transverse rollers 17 that rotatably engage an object being conveyed by the belt 10 to reduce friction between the belt 10 and the object. Advantageously, if the module 12, cradle 16, or roller 17 is damaged, only the damaged component needs to be replaced.

The modules 12 are preferably formed using methods known in the art, such as injection molding, from materials known in the art, such as acetal, polyethylene, polypropylene, nylon, and the like. Each module 12 includes a body 18 having a top surface 20 surrounded by a leading edge 22 and trailing edge 24 joined by side edges 26. Advantageously, the top surface 20 can prevent objects from falling through the module belt 10. Of course, the top surface 20 can also have perforations to allow air or other fluid flow for cooling, drafting, or draining.

The module body 18 has a width which is defined by the distance between the side edges 26, and a length which is defined by the distance between the longitudinal leading and trailing edges 22, 24. Leading edge hinge members 32 extending forwardly from the leading edge 22 of the module body 18 include coaxial openings 34. The opening 34 formed in each leading edge hinge member 32 is coaxial with the opening 34 in the adjacent leading edge hinge member 32 for receiving the hinge pin 14. Trailing edge hinge members 36 extending rearwardly from the trailing edge 24 also include coaxial openings 38. As in the leading edge hinge member openings 34, the opening 38 formed in each trailing edge hinge member 36 is coaxial with the opening in the adjacent trailing edge hinge member 36 of a module 12.

The forwardly extending leading edge hinge members 32 of one module 12 intermesh with trailing edge hinge members 36 extending rearwardly from an adjacent module 12. When the intermeshing hinge members 32, 36 are aligned, the openings 34, 38 in the aligned hinge members 32, 36 are aligned to receive the hinge pin 14 which pivotally joins the modules 12 together. Although hinge members 32, 36 extending rearwardly and forwardly from the leading and trailing edges 22, 24, respectively, are shown, the hinge members 32, 36 can also extend in other directions, such as downwardly, proximal the respective edges 22, 24 without departing from the scope of the present invention.

Figure 5:
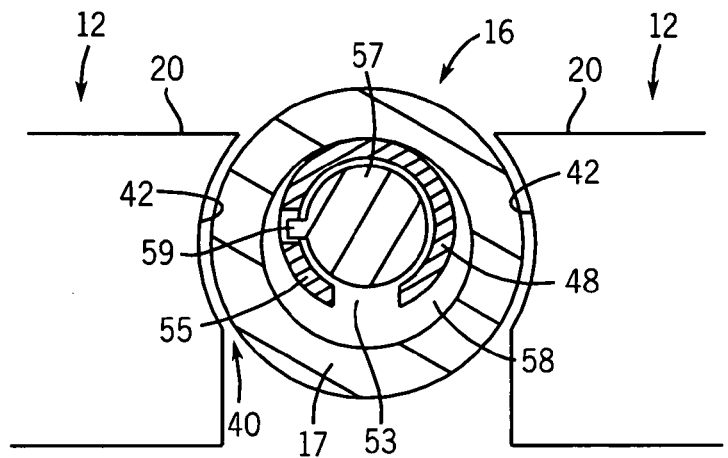
FIG. 5 is a cross sectional view of an alternative embodiment of a modular conveyor belt incorporating the present invention.

Each side edge 26 of the module body 18 includes a concave portion 40 defined by a concave surface 42 that opens toward, and faces, a concave surface 42 formed in the side edge 26 of the adjacent module body 18. The concave surfaces 42 wrap around a portion of the roller 17 supported between the adjacent modules 12. In one embodiment shown in FIG. 5, the roller 17 disposed between the modules 12 extends into the concave portions 40 of each module body 18 which allows the top surfaces 20 of the adjacent module bodies 18 to extend over a portion of the roller 17, and minimize the gap between adjacent modules 12 and between the adjacent body top surfaces 20 and the roller 17. However, in a preferred embodiment shown in FIG. 2, the top surfaces 20 do not extend over a portion of the roller 17 to simplify manufacturing of the module 12.

The cradles 16 are retained by the hinge pins 14 between adjacent modules 12, and are not attached directly to the modules 12. The position and number of cradles 16 in the belt 10 is customizable, and depends upon the conveyor belt application. Preferably, the cradles 16 are formed using methods known in the art, such as injection molding, from materials known in the art, such as acetal, polyethylene, polypropylene, nylon, and the like. However, the cradles can be formed from other materials, such as metal, without departing from the scope of the invention.

Figure 3:
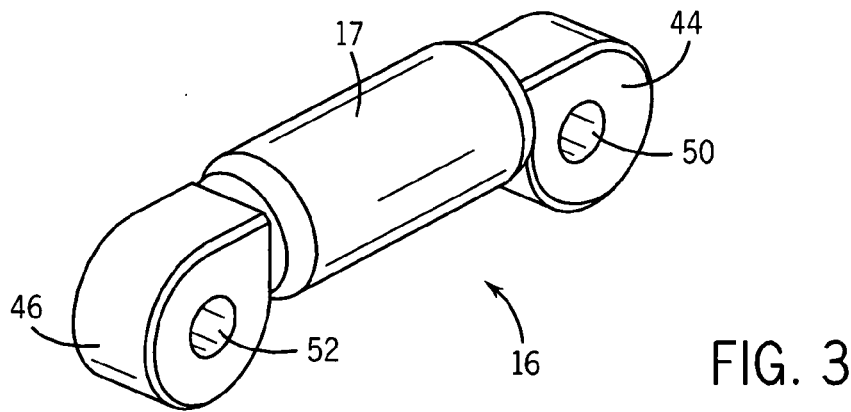
FIG. 3 is a perspective view of a cradle in FIG. 1.
Figure 4:
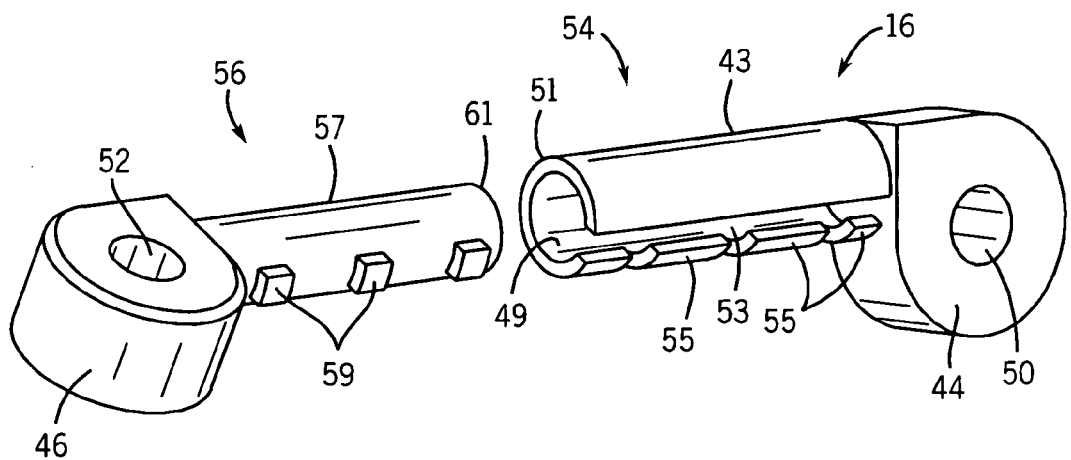
FIG. 4 is a perspective, exploded view of the cradle shown in FIG. 3.

As shown in FIGS. 2–4, each cradle 16 includes an outer shaft 48 extending between a leading edge hinge member 44 and a trailing edge hinge member 46. The outer shaft 48 rotatably supports the roller 17 disposed between the adjacent module side edges 26. Each cradle hinge member 44, 46 includes an opening 50, 52 which is aligned with the openings 34, 38 in adjacent module hinge members 32, 36. The openings 34, 38, 50, 52 are aligned for receiving the hinge pin 14 which pivotally joins adjacent rows of modules 12 and cradles 16 together and fixes the cradles 16 relative to the modules 12 in a row. Although the cradle and module hinge members are designated as leading edge and trailing edge for convenience, the cradle and module disclosed herein can be used in any orientation without departing from the scope of the invention.

Each cradle 16 is preferably formed from two parts 54, 56. The first part 54 includes one of the hinge members 44 and the outer cylindrical shaft 48. The outer shaft 48 includes a hollow portion 49 opening at an outer shaft distal end 51. An axial slot 53 extends from the shaft distal end 51 toward the hinge member 44, and circumferential slots 55 spaced axially along the outer shaft 48 intersect the axial slot 53. The second part 56 includes the other hinge member 46 and an inner shaft 57 having radially extending keys 59 spaced axially along the inner shaft 57. A distal end 61 of the inner shaft 57 is axially received in the hollow portion 49 of the outer shaft 48 through the outer shaft distal end 51 to form the cradle 16.

The keys 59 are received in the circumferential slots 55 to axially lock the shafts 48, 57 relative to each other. Advantageously, the keys can be sized to frictionally engage the circumferential slots 55 to rotatably fix the shafts 48, 57 relative to each other. The keys 59 can formed as an integral part of the inner shaft 57, or formed separately and joined to the inner shaft 57 using methods known in the art, such as fasteners, ultrasonic welding, over molding, and the like, without departing from the scope of the invention.

Although keys extending radially from the inner shaft 57 that engage structure formed in the outer shaft 48 are disclosed to axially lock the parts 54, 56 relative to each other, the keys, or other interlocking structure, can extend radially inwardly from the outer shaft end engage circumferential slots, or other complementary structure, formed in the inner shaft without departing from the scope of the invention. Other methods known in the art can be used to fix the shafts together and form the cradle. For example, the outer and inner shafts 48, 57 can be sized to frictionally engage each other to fix the shafts 48, 57 relative to each other without additional interlocking structure. Moreover, the shafts can be bonded together using adhesives, welding, and the like, without departing from the scope of the invention.

Referring to FIGS. 1–4, the roller 17 is supported by the outer shaft 48, and at least a portion of the roller 17 extends above the cradle 16 to engage the object being conveyed by the belt 10. Preferably, the roller 17 is molded from a plastic, and includes a throughhole 58 formed therethrough for receiving the shaft 48. Advantageously, the roller 17 rotates about the shaft 48 to minimize friction between the belt 10 and object being conveyed. Although a plastic roller is disclosed, the roller can be formed from any material, such as elastomers, metals, and the like, suitable for the particular application without departing from the scope of the invention.

The cradle 16 is assembled by slipping the roller 17 onto the outer shaft 48, and axially aligning the shafts 48, 57 with the keys 59 extending radially from the inner shaft 57 aligned with the axial slot 53 formed in the outer shaft 48. The distal end 61 of the inner shaft 57 is slipped axially into the hollow portion 49 of the outer shaft 48 through the outer shaft distal end 51 until each key 59 is aligned with one of the circumferential slots 55. One of the parts 54, 56 is then twisted, or rotated, about a shaft longitudinal axis, relative to the other part 54, 56 to urge the keys 59 into the circumferential slots 55 and axially lock the parts 54, 56 relative to each other.

The belt 10 is assembled by positioning at least one cradle 16 between concave surfaces 42 of adjacent modules 12, and aligning the trailing and leading edge hinge members 32, 36, 44, 46 of the adjacent modules 12 and cradles 16, such that the trailing hinge members openings 38, 52 are aligned and the leading edge hinge member openings 34, 50 are aligned to form a row of modules 12 and cradles 16. The trailing edge hinge members 36, 46 of the row of modules 12 and cradles 16 are intermeshed with aligned leading edge hinge members 32, 44 of an adjacent row of modules 12 and cradles 16, such that the openings 34, 38, 50, 52 in the intermeshed hinge members 32, 36, 44, 46 are aligned. A hinge pin 14 is then slipped through the aligned hinge member openings 34, 38, 50, 52 to pivotally link the modules 12 and cradles 16 forming one row to the modules 12 and cradles 16 forming the other row to form the belt 10.

Figure 6:
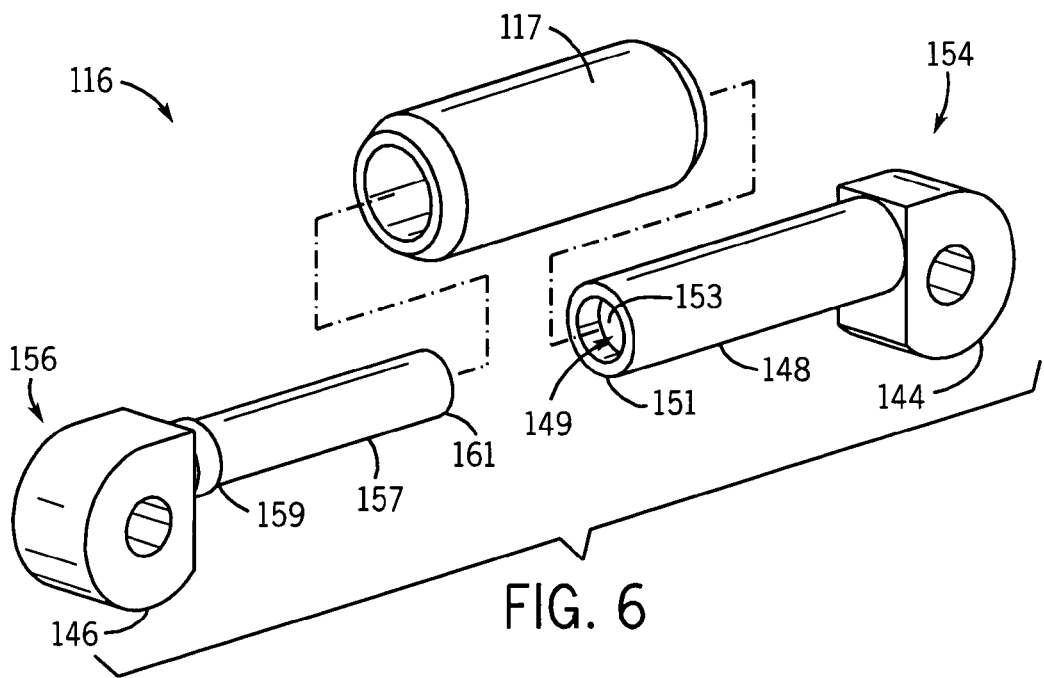
FIG. 6 is a perspective, exploded view of a cradle that snap together which is suitable for use in the belt of FIG. 1.

In another embodiment shown in FIG. 6, a cradle 116 includes first and second parts 154, 156, such as in the first embodiment disclosed above. The first part 154 includes a hinge member 144 and an outer cylindrical shaft 148 having a distal end 151 spaced from the hinge member 144. The outer shaft 148 includes a hollow portion 149 opening at the outer shaft distal end 151. A radially inwardly opening groove 153 is formed in the hollow portion 149 proximal the outer shaft distal end 151. The second part 156 includes another hinge member 146 and an inner shaft 157 having a radially outwardly extending lip 159 formed proximal the hinge member 146. Although forming the lip proximal the hinge member and the groove proximal the outer shaft distal end is disclosed, the lip and groove can be formed anywhere along the shafts, such that they are engageable with each other without departing from the scope of the invention.

The cradle 116 disclosed in FIG. 6 is formed from a resilient material, such as plastic, and is assembled by slipping a roller 117 over the outer shaft 148, and inserting the distal end 161 of the inner shaft 157 into the hollow portion 149 of the outer shaft 148 through the outer shaft distal end 151 to form the cradle 116. As the inner shaft 157 is urged into the hollow portion 149 of the outer shaft 148, the inner shaft 157 and/or the outer shaft 148 deform to allow the lip 159 to pass into the hollow portion 149. The inner shaft 157 and/or outer shaft 148 return to the undeformed state when the lip 159 is received in the groove 153 to axially fix the shafts 148, 157 relative to each other and form the cradle 116. Of course, the lip, or other engaging structure, can be formed in the hollow portion which is received in a groove, or other receiving structure, formed on the inner shaft without departing from the scope of the invention.

Figure 7:
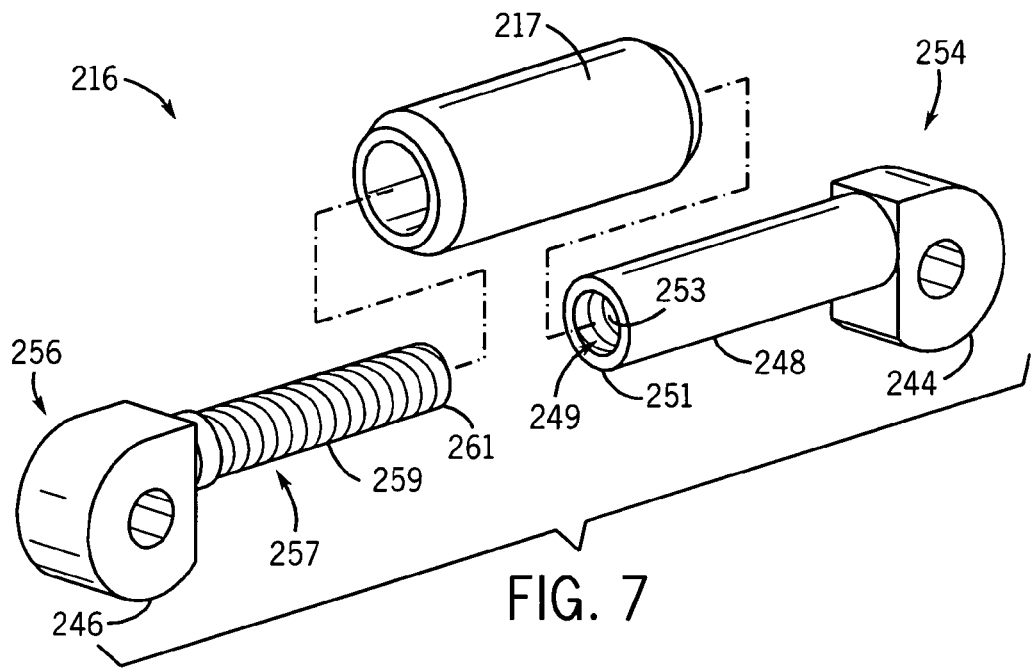
FIG. 7 is a perspective, exploded view of a cradle having threaded shafts which is suitable for use in the belt of FIG. 1.

In another embodiment shown in FIG. 7, a cradle 216 includes first and second parts 254, 256, such as in the first embodiment disclosed above. The first part 254 includes a hinge member 244 and an outer cylindrical shaft 248 having a distal end 251 spaced from the hinge member 244. The outer shaft 248 includes a hollow portion 249 opening at the outer shaft distal end 251. Internal threads 253 are formed in the hollow portion 249. The second part 256 includes another hinge member 246 and an inner shaft 257 having external threads 259 that threadably engage the internal threads 153 formed in the outer shaft hollow portion 249

The cradle disclosed in FIG. 7 is formed from a resilient material, such as plastic, and is assembled by slipping a roller 217 over the outer shaft 248. The distal end 261 of the inner shaft 257 is then inserted into the hollow portion 249 of the outer shaft 248 through the outer shaft distal end 251. One of the shafts 248, 257 is rotated relative to the other shaft 248, 257 to threadably engage the internal and external threads 253, 259 to fix the inner shaft 257 relative to the outer shaft 248 and form the cradle 216.

Figure 8:
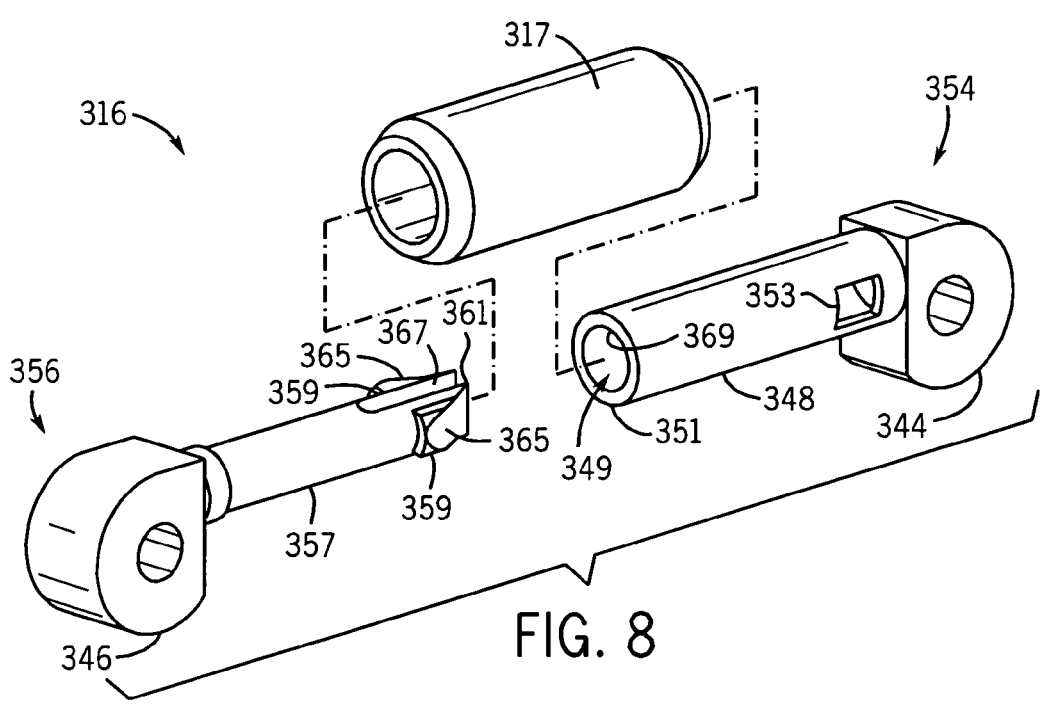
FIG. 8 is a perspective, exploded view of another cradle having shafts that snap together which is suitable for use in the belt of FIG. 1.

In another embodiment shown in FIG. 8, a cradle 316 includes first and second parts 354, 356, such as in the first embodiment disclosed above. The first part 354 includes a hinge member 344 and an outer cylindrical shaft 348 having a distal end 351 spaced from the hinge member 344. The outer shaft 348 includes a hollow portion 349 opening at the outer shaft distal end 351. Apertures 353, or receiving structure, are formed in the outer shaft 348 proximal the hinge member 344 for engaging barbs 359, or engaging structure, forming part of an inner shaft 357 to fix the shafts 348, 357 relative to each other.

The second part 356 includes another hinge member 346 and the inner shaft 357 having the barbs 359 formed at a distal end 361 of the inner shaft 357. Each barb 359 include an outwardly facing camming surface 365 spaced by a longitudinal slot 367 formed in the inner shaft distal end 361. The slot 367 allows the barbs 359 to deform inwardly as the camming surfaces 365 engage the inner wall 369 of the hollow portion 349 of the outer shaft 348.

The cradle 316 disclosed in FIG. 8 is assembled by slipping a roller 317 over the outer shaft 348. The distal end 361 of the inner shaft 357 is then inserted into the hollow portion 349 of the outer shaft 348 through the outer shaft distal end 351. As the distal end 361 of the inner shaft 357 is inserted into the hollow portion 349, the barbs 359 engage the inner wall 369 of the hollow portion 349 and deform inwardly. Once the inner shaft 357 is fully inserted into the hollow portion 349 and the barbs 359 are aligned with the apertures 353 formed in the outer shaft 348, the barbs 359 snap outwardly into the apertures 353 to axially and rotatably fix the shafts 348, 357 together and form the cradle 316. Although two barbs are shown, one or more barbs can be used without departing from the scope of the invention.

While there has been shown and described what are at present considered the preferred embodiments of the invention, it will be obvious to those skilled in the art that various changes and modifications can be made therein without departing from the scope of the invention defined by the appended claims. For example, the shafts disclosed herein are cylindrical having a circular cross section, however, the shafts can have any cross section. Moreover, the hollow portion can be a concave surface, such as formed from a shaft having a semi-circular cross section, which is open along the length of the shaft.

We claim:

1. A roller cradle for use in a modular conveying assembly, said cradle comprising:
   a first part including a first hinge member and a first shaft extending from said first hinge member, said first shaft having a hollow portion opening at a first shaft distal end;
   a second part including a second hinge member and a second shaft extending from said second hinge member, said second shaft having a second shaft distal end received in said hollow portion of said first shaft through said first shaft distal end.

2. The roller cradle as in claim 1, in which a roller is rotatably supported by said first shaft.

3. The roller cradle as in claim 1, in which one of said first and second shafts includes an axial slot extending from said first shaft distal end.

4. The roller cradle as in claim 3, in which said one of said first and second shafts includes at least one circumferential slot intersecting said axial slot, and the other of said first and second shafts includes at least one radially extending key received in said at least one circumferential slot.

5. The roller cradle as in claim 1, in which one of said first and second shafts includes at least one engaging structure, and the other of said first and second shafts includes at least one receiving structure for receiving said at least one engaging structure to axially fix said first and second shafts relative to each other.

6. The roller cradle as in claim 5, in which said at least one engaging structure is selected from a group consisting of a lip and a barb.

7. The roller cradle as in claim 5, in which said receiving structure is selected from a group consisting of a groove and an aperture.

8. The roller cradle as in claim 1, in which said first and second shafts include threads that threadably engage to fix said shafts relative to each other.

9. The roller cradle as in claim 1, in which said shafts are bonded together.

10. The roller cradler as in claim 1, in which at least one of said shafts is cylindrical.

11. A modular conveying assembly for conveying an object, said assembly comprising:
a plurality of chain modules assembled in an edge to edge relation to form a continuous belt, at least one of said modules having side edges joined by leading and trailing edges, and at least one of said side edges including a concave portion defined by a concave surface facing a side edge of an adjacent chain module;
at least one hinge pin joining said at least one of said modules and said adjacent chain module;
at least one cradle interposed between said at least one of said modules and said adjacent chain module; and
a roller supported by said cradle and extending into said concave portion.

12. The modular conveying assembly as in claim 11, in which said cradle includes:
a first part including a first hinge member and a first shaft extending from said first hinge member, said first shaft having a hollow portion opening at a first shaft distal end;
a second part including a second hinge member and a second shaft extending from said second hinge member, said second shaft having a second shaft distal end received in said hollow portion of said first shaft through said first shaft distal end.

13. The modular conveying assembly as in claim 12, in which said roller is rotatably supported by said first shaft.

14. The modular conveying assembly as in claim 12, in which one of said first and second shafts includes an axial slot extending from said first shaft distal end.

15. The modular conveying assembly as in claim 14, in which said one of said first and second shafts includes at least one circumferential slot intersecting said axial slot, and the other of said first and second shafts includes at least one radially extending key received in said at least one circumferential slot.

16. The modular conveying assembly as in claim 12, in which one of said first and second shafts includes at least one engaging structure, and the other of said first and second shafts includes at least one receiving structure for receiving said at least one engaging structure to axially fix said first and second shafts relative to each other.

17. The modular conveying assembly as in claim 16, in which said at least one engaging structure is selected from a group consisting of a lip and a barb.

18. The modular conveying assembly as in claim 16, in which said receiving structure is selected from a group consisting of a groove and an aperture.

19. The modular conveying assembly as in claim 12, in which said first and second shafts include threads that threadably engage to fix said shafts relative to each other.

20. The modular conveying assembly as in claim 12, in which said shafts are bonded together.

21. The modular conveying assembly as in claim 12, in which at least one of said shafts is cylindrical.

22. The modular conveying assembly as in claim 11, in which said at least one of said modules includes a top surface extending over a portion of said roller.

23. A modular conveying assembly for conveying an object, said assembly comprising:
a plurality of chain modules assembled in an edge to edge relation to form a continuous belt, at least one of said modules having side edges joined by leading and trailing edges, and at least one of said side edges including a concave portion defined by a concave surface facing a side edge of an adjacent chain module;
at least one hinge pin joining said at least one of said modules and said adjacent chain module;
at least one cradle interposed between said at least one of said modules and said adjacent chain module, said cradle including a first part and a second part, said first part including a first hinge member and a first shaft extending from said first hinge member, said first shaft having a hollow portion opening at a first shaft distal end, and said second part including a second hinge member and a second shaft extending from said second hinge member, said second shaft having a second shaft distal end received in said hollow portion of said first shaft through said first shaft distal end; and
a roller supported by said cradle and extending into said concave portion.

24. The modular conveying assembly as in claim 23, in which said roller is rotatably supported by said first shaft.

25. The modular conveying assembly as in claim 23, in which said first shaft includes an axial slot extending from said first shaft distal end.

26. The modular conveying assembly as in claim 25, in which said first shaft includes at least one circumferential slot intersecting said axial slot, and said second shaft includes at least one radially extending key received in said at least one circumferential slot.

27. The modular conveying assembly as in claim 23, in which one of said first and second shafts includes at least one engaging structure, and the other of said first and second shafts includes at least one receiving structure for receiving said at least one engaging structure to axially fix said first and second shafts relative to each other.

28. The modular conveying assembly as in claim 27, in which said at least one engaging structure is selected from a group consisting of a lip and a barb.

29. The modular conveying assembly as in claim 27, in which said receiving structure is selected from a group consisting of a groove and an aperture.

30. The modular conveying assembly as in claim 23, in which said first and second shafts include threads that threadably engage to fix said shafts relative to each other.

31. The modular conveying assembly as in claim 23, in which said shafts are bonded together.

32. The modular conveying assembly as in claim 23, in which at least one of said shafts is cylindrical.

33. The modular conveying assembly as in claim 23, in which said at least one of said modules includes a top surface extending over a portion of said roller.

* * * * *